E. T. HUDSON.
HAY BALER.
APPLICATION FILED AUG. 6, 1915.

1,241,981.

Patented Oct. 2, 1917.
6 SHEETS—SHEET 1.

Witnesses
J. P. Waler
Robt Meyer

Inventor
E. T. Hudson.
By
Attorney

E. T. HUDSON.
HAY BALER.
APPLICATION FILED AUG. 6, 1915.

1,241,981.

Patented Oct. 2, 1917.
6 SHEETS—SHEET 2.

Witnesses
Inventor
E. T. Hudson.
By
Attorney

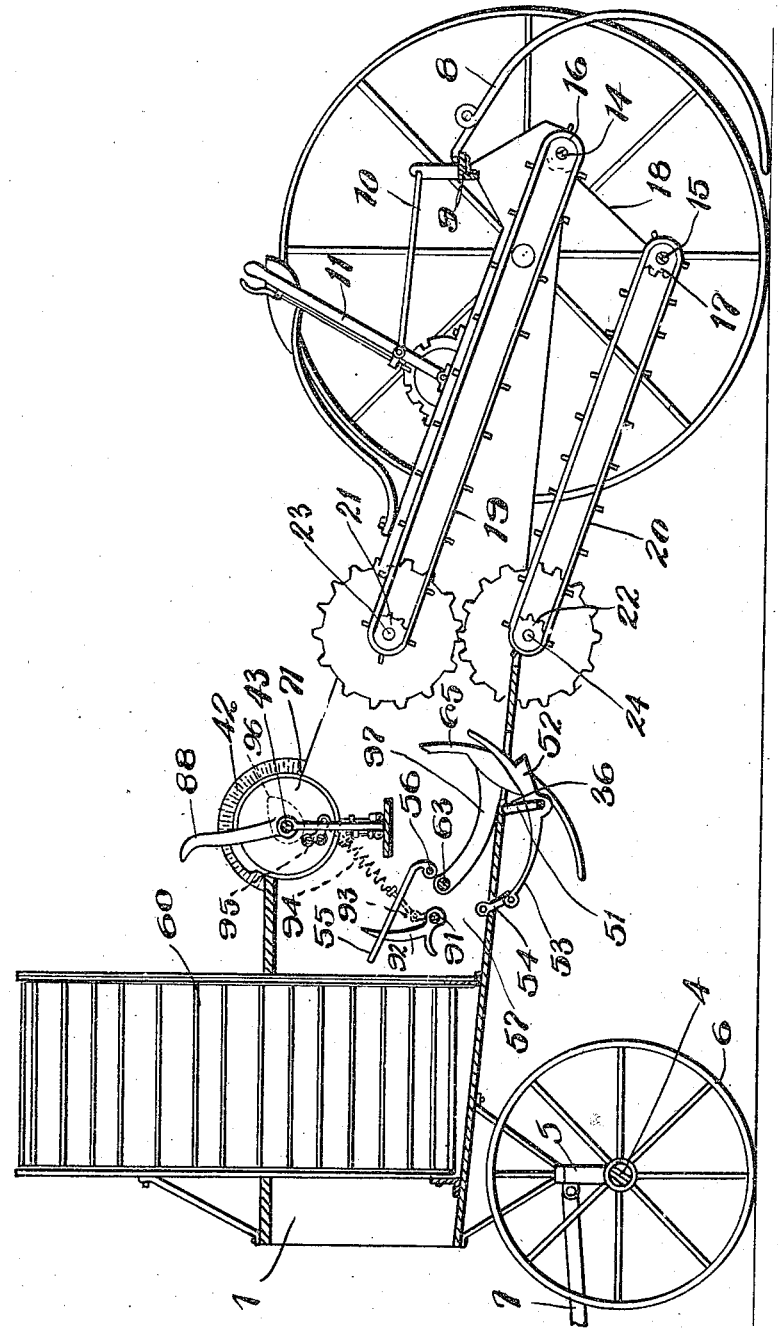

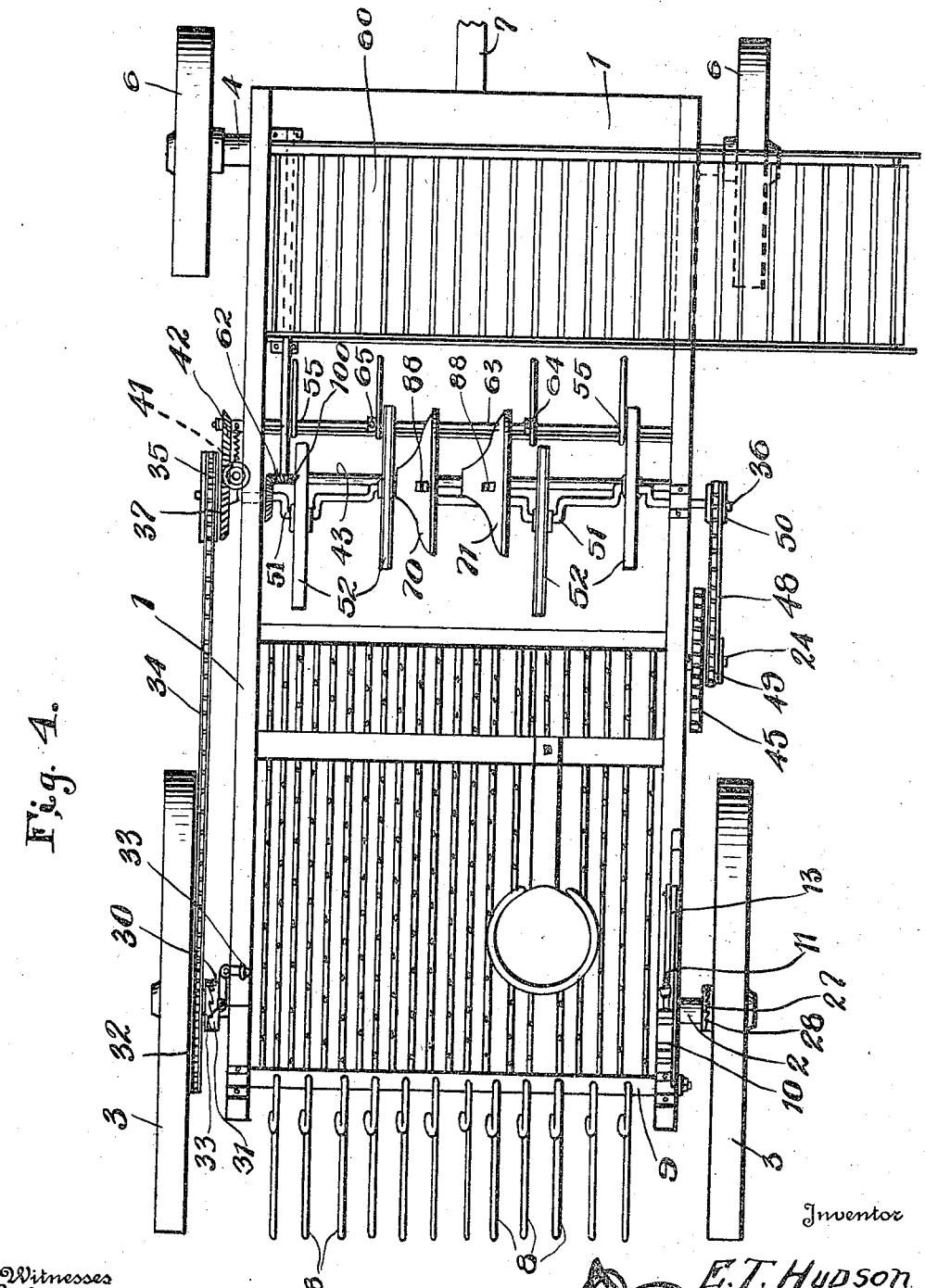

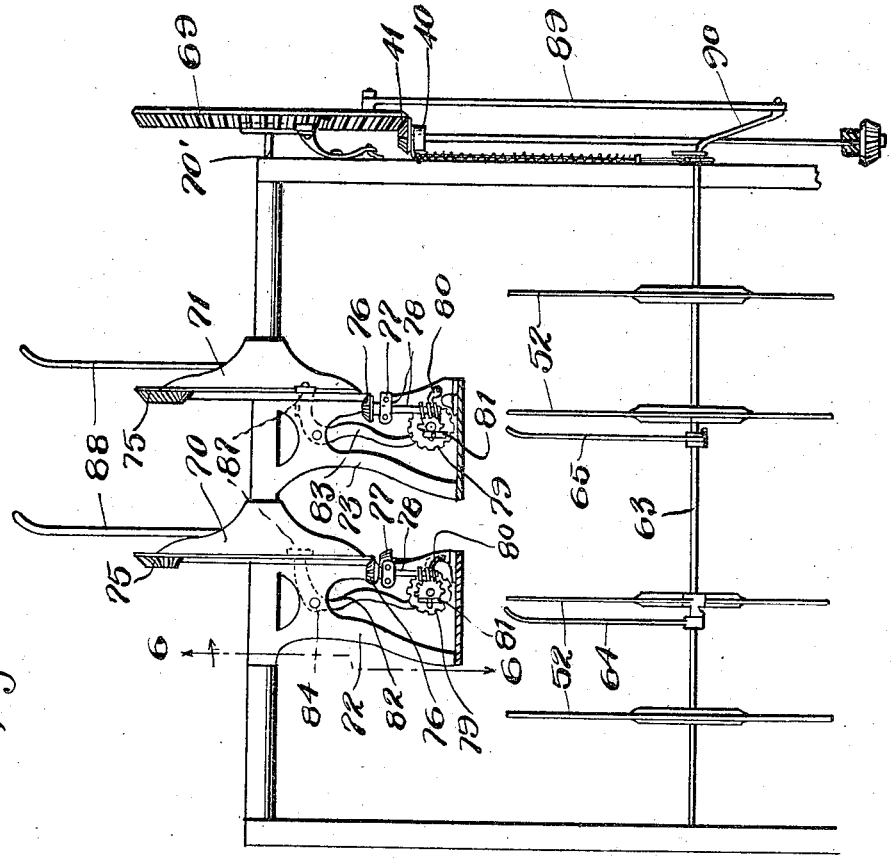
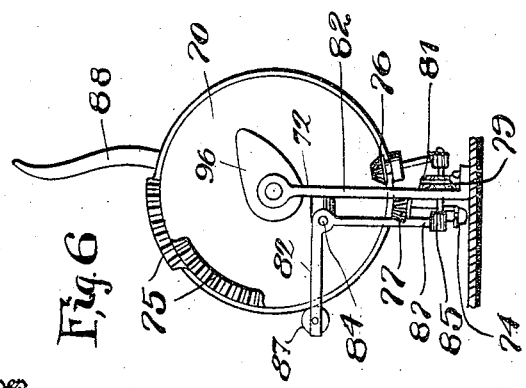

E. T. HUDSON.
HAY BALER.
APPLICATION FILED AUG. 6, 1915.

1,241,981.

Patented Oct. 2, 1917.
6 SHEETS—SHEET 6.

Witnesses
J. P. Wohler
Rob't Meyer

Inventor
E. T. Hudson.
By *Attorney*

UNITED STATES PATENT OFFICE.

EDWARD T. HUDSON, OF SUPERIOR, NEBRASKA.

HAY-BALER.

1,241,981.  Specification of Letters Patent.  Patented Oct. 2, 1917.

Application filed August 6, 1915. Serial No. 44,085.

*To all whom it may concern:*

Be it known that I, EDWARD T. HUDSON, a citizen of the United States, residing at Superior, in the county of Nuckolls and State of Nebraska, have invented certain new and useful Improvements in Hay-Balers; and I do hereby declare the following to be a full, clear, and exact description of the invention, such as will enable others skilled in the art to which it appertains to make and use the same.

This invention relates to hay balers, and the primary object of the invention is to provide a portable hay baler for travel over a meadow or field, in which the hay has been cut, and is either in swaths or windrows, and which baler is provided with a raking construction for raking the hay and also with suitable conveyers for conveying the hay from the raking structure to the baling structure.

Another object of this invention is to provide means for tying the hay in bales of various weights, which weight may be regulated to suit conditions, and also to provide tamping or packing arms which are automatically operable by the travel of the improved hay baler for packing the hay in the baling chamber prior to the binding or tying thereof.

Another object of this invention is to provide a novel form of mechanism for controlling the operation of the tying mechanism, so as to regulate the operation thereof for tying the bales at the proper time, and further to provide means for operating the foregoing mechanism by the traction of the hay baler.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Fig. 3 is a longitudinal section through the hay baler, Fig. 4 is a plan view of the hay baler, Fig. 5 is a detail side elevation of the tying mechanism, Fig. 6 is a plan view of the tying mechanism.

Figure 1:
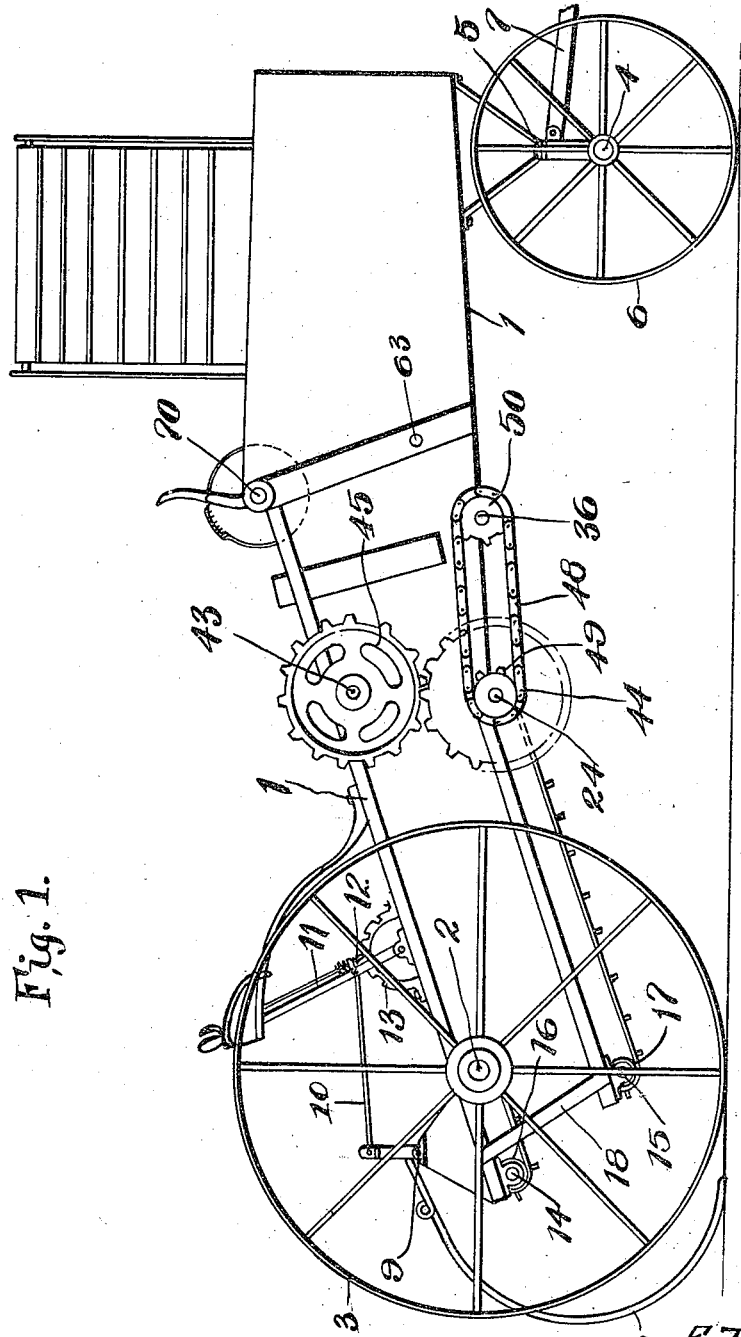
Figure 1 is a side elevation of the improved hay baler.
Figure 2:
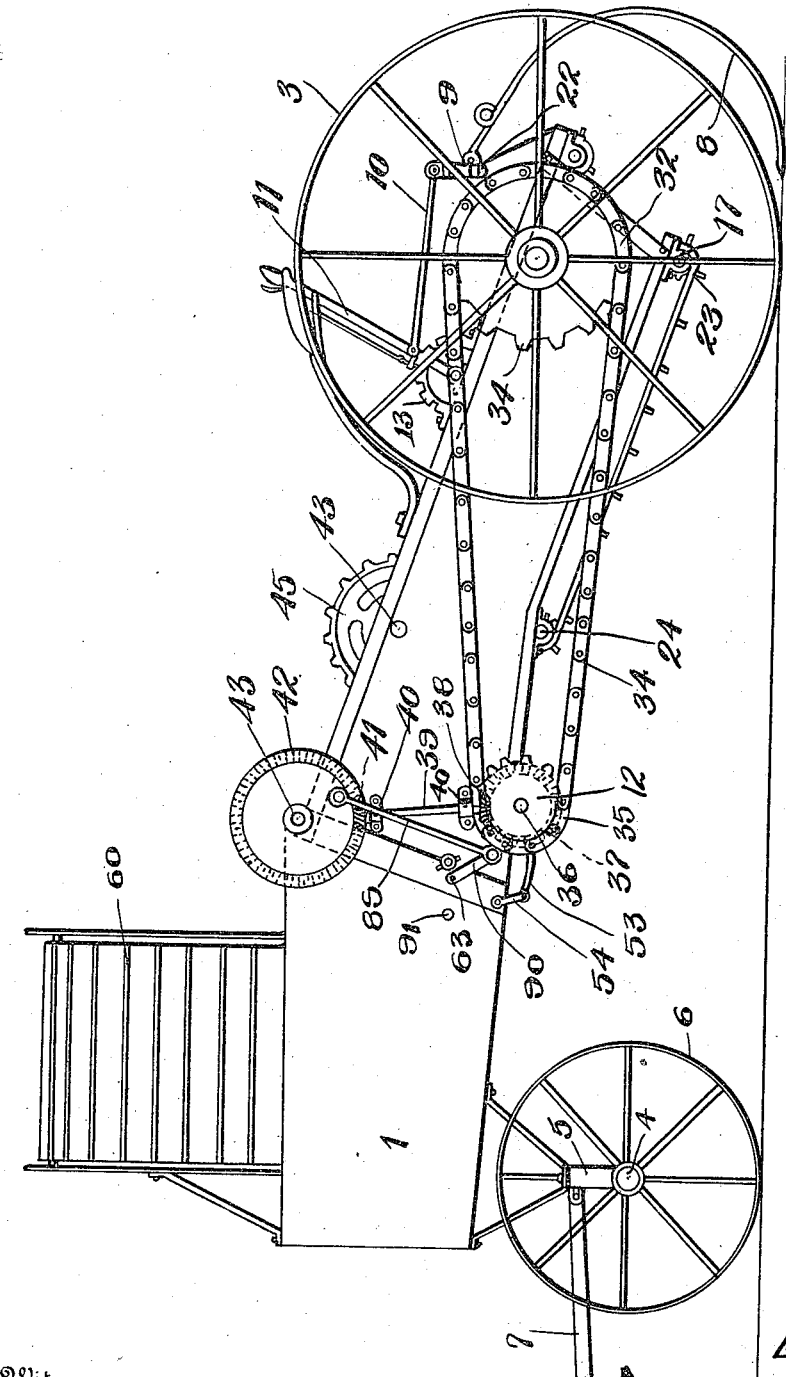
Fig. 2 is an elevation of the opposite side of the hay baler from that shown in Fig. 1.
Figure 7:
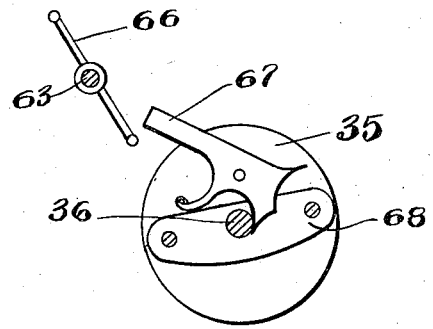
Fig. 7 is a detail view of a part of the construction of the baler.
Figure 8:
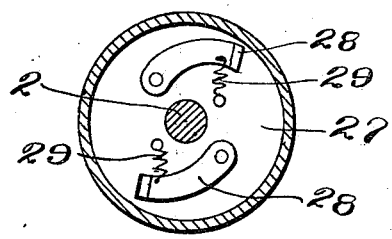
Fig. 8 is a detail view of another part of the construction of the baler.
Figure 9:
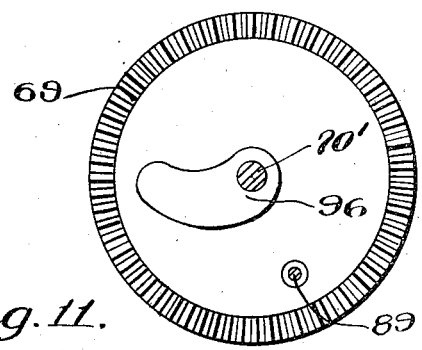
Fig. 9 is a detail plan view of one of the gear wheels and cams.
Figure 10:
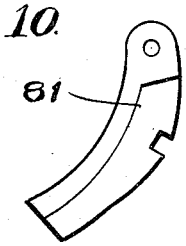
Fig. 10 is a detail plan view of one of the twine holders.

Referring more particularly to the drawings, 1 designates the supporting structure of the hay baler as an entirety, which has a rear axle 2 carried thereby, upon the spindle ends of which are mounted supporting wheels 3. The supporting structure 1 has a front axle 4 connected thereto by means of a fifth wheel connection, as indicated at 5. The axle 4 has supporting wheels 6 mounted thereupon, and a tongue 7 connected thereto and extending forwardly therefrom, which tongue is provided for attaching any suitable type of draft animal to the baler for drawing it over a field for the gathering and baling of hay.

The rear end of the supporting structure 1 has a plurality of arcuate tines or teeth 8 connected thereto, for pivotal movement into or out of a raking position. The upper ends of the tines or teeth 8 have a cross bar 9 connected thereto, to which a rod 10 is connected. The rod 10 extends forwardly from the bar 9 and is connected to a lever 11. The lever 11 has the usual type of dog mechanism 12 carried thereby, which co-acts with a quadrant 13 for holding the teeth 8 into or out of an operative position.

The supporting structure 1 has a pair of transversely extending shafts 14 and 15 secured to the rear end thereof, upon which are mounted rollers 16 and 17. The shafts 14 and 15 are braced by a brace bar 18, which extends from one shaft to the other, as is clearly shown in Fig. 3 of the drawings. Conveyers 19 and 20 travel about the rollers 16 and 17, and about rollers 21 and 22, which are mounted upon shafts 23 and 24. The shafts 23 and 24 are carried by the supporting structure forwardly of the shafts 14 and 15. The conveyers 19 and 20 are spaced from each other and travel in opposite directions, so that the under sections of the conveyer 19 and the upper section of the conveyer 20, will engage the hay after it has passed upwardly over the teeth 8 and carry it upwardly along the supporting frame to the baling structure, which will be hereinafter more fully described.

The supporting wheels 3 are rotatably mounted upon the rear supporting axle 2 and they have ratchets 26 mounted upon the hub section thereof. The axle 2 has disks 27 mounted thereupon. The disks 27 have pawls 28 pivotally connected thereto and controlled by springs 29, which pawls are provided for engagement with the peripheral teeth of the ratchet wheels 26 to permit of the backing of the rings without rotating the axle, and also to permit of the proper guiding of the machine.

The axle 2 has a sprocket 32 rotatably mounted thereon, upon one side of the hub portion of which sprocket is formed a clutch section 30. The clutch section 30 is provided for coaction with the clutch section 31 which is carried upon the axle. A lever 33 is connected to the clutch section 31 for shifting it upon the axle into or out of engagement with the clutch section 30 for controlling the operation of the sprocket 32 by the rotation of the axle.

The sprocket 32 has a sprocket chain 34 traveling about the same, which also travels about a sprocket 35 which is mounted upon a shaft 36. The shaft 36 has a beveled gear 37 mounted thereon, with which a pinion 38 meshes. The pinion 38 is carried by one end of a shaft 39, which extends upwardly therefrom, substantially in a vertical plane, and is supported by suitable supporting brackets or metallic straps 40. The shaft 39 has a beveled pinion 41 mounted upon its upper end, which meshes with a beveled gear 42, which is carried by a shaft 43.

The shaft 36 has a gear 44 mounted thereon, which meshes with a gear 45 which is carried by the shaft 43. The shaft 43 has a plurality of sprockets mounted thereon, about which the elevator 19 travels, and the gears 44 and 45 are provided for imparting rotation to the shaft 43 for operating the conveyer.

The shaft 24, upon which the gear 44 is mounted, also has a plurality of sprockets spaced longitudinally thereon, about which the lower conveyer 20 travels, for operating the conveyer. A sprocket chain 48 travels about a sprocket 49, which is mounted upon the shaft 24, and about a sprocket 50, which is mounted upon the shaft 36.

The shaft 36 has a plurality of cranks 51 formed thereon, each alternate crank extending in opposite direction to the one next thereto. The cranks have packing arms 52 connected thereto, which are also connected to pivotally supported rods 53 and 54, for imparting a packing or tamping action to the arms 52 upon rotation of the crank shaft 36, for packing the hay against the trip fingers 55. The trip fingers or levers 55 are pivotally supported at 56, in front of the mouth of the baling chamber 57, and they are positioned for being tripped after the proper amount of hay has been packed thereon, and efficiently tied, for forming bales. When the levers 55 are tripped, the hay which has been baled, will pass rearwardly therefrom upon a conveyer 60, which extends transversely to the direction of travel of the hay rake and baler which will carry the bales for deposit in a wagon or the like.

The conveyer 60 is operated by any suitable type of power transmitting means, such as illustrated at 62 in Fig. 4 of the drawings.

A shaft 63 is rotatably supported by the supporting structure, and it has needles 64 and 65 mounted thereon, for feeding the binding or tying element to the knotting mechanism, which will be hereinafter more fully described, for tying the hay in bales.

The shaft 63 has a member 66 mounted thereon, which co-acts with a pawl 67. The pawl 67 is pivotally mounted upon one face of the beveled gear 35, and is operated by a double driver 68, which is carried by the shaft 36. The member 66 striking the pawl 67, controls the operation of the needle carrying shaft 63, for operating the needles at the proper time.

Figure 11:
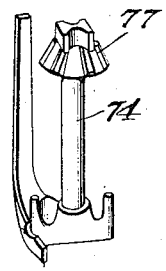
Fig. 11 is a detail plan view of the knotter.

The beveled pinion 41, which is mounted upon the upper end of the shaft 39, meshes with a beveled gear 69, which is mounted upon the knotter shaft 70'. The knotter shaft 70' is rotatably supported in any suitable manner, by the supporting structure of the device, and it has knotter cams 70 and 71 mounted thereon. The shaft 70 also has knotter frames 72 and 73 mounted thereon, which carry knotters 74 of the ordinary construction as illustrated in Fig. 11.

The cams 70 and 71 have beveled teeth 75 formed on a section of their peripheries, which mesh with beveled gears 76 and 77 of the knotter 74. The beveled gears 76 and 77 are mounted upon shafts 78, upon which shafts are mounted ratchet wheels 79. The ratchet wheels 79 are normally held against rotation by flat springs 80, and they have twine holders 81 secured thereto, for feeding the twine therefrom for tying the hay into bales.

A cutting mechanism is employed, which includes knives 82 and 83, which are pivotally supported at 84, and are provided for cutting the twine, after the same has been knotted by the knotter 74. Rollers 85 are provided, against which the twine is forced by the knives for properly cutting the same. The knives 82 and 83 have rollers 87 carried upon their ends which ride over the peripheries of the cams 70 and 71, for properly operating the knives for cutting the twine.

The cams 70 and 71 have discharge arms 88 secured thereto and extending radially from their peripheries, which arms are provided for discharging a properly tied bale.

The gear 69 has a pitman 89 eccentrically connected thereto, which pitman is in turn connected to a crank 90 which is formed upon one end of the needle shaft 63, whereby the needle shaft is rotated by the rotation of the shaft 70' and the gear 69.

A shaft 91 is rotatably supported by the supporting structure 1, and it has a plurality of compressor hooks 92 mounted thereon. The shaft 91 has a lever 93 mounted thereon, which is operated by a spring 94. The spring 94 is in turn operated by a lever 95, which is positioned in the path of a cam 96 formed upon one face of the cam 70.

The needles 65 are carried by arms 97, which connect the needles to the shaft as shown in Fig. 3 of the drawings. The compression hooks are drawn into the hay during the tying operation of the knotter and needles, by the cam 96 rocking the shaft 91 through the medium of the spring 94, which permits of yieldable movement of the compression hooks.

The conveyer 60 is operated by the main crank shaft 36, through a beveled gear and shaft connection, as shown at 100. The conveyer 60 may have flights secured thereto at spaced intervals, which may be formed of angle iron, so as to receive the bales and carry them to a wagon, or like structure. Spring controlled tighteners or idlers may be provided on the under side of the elevator, and engage the conveyer for holding it taut at all times during its operation.

In the operation of the improved hay gatherer, rake and baler, the hay is raked from swaths or windrows in a meadow or field, by the raking action of the teeth 8. The curvature of the teeth 8, and the continuous passage of the hay against the teeth, will force the hay upwardly over the teeth and into a position to be engaged by the conveyers 19 and 20 upon their operation. The hay will be engaged by the flights which have the projecting fingers or tines secured thereto, and carried upwardly between the two conveyers until it is engaged by the packing arms 52, which will pack the hay against the levers 55 until the sufficient quantity for forming a bale is accumulated. The hay is further packed by the action of the compressing hooks 92, which are moved forwardly against the hay, during the operation of the needles 64 and 65, for feeding the twine to the knotting mechanism. The bales are tied by the twine which is fed from the twine retaining boxes, through the needles 65 and 64, to the knotters 74, which tie the bales ready for discharge by the arms 88. After the bales have been properly tied, they are discharged or forced rearwardly upon the conveyer 60 by the arms 88, which move rearwardly during the rotation of the wheels 70. The bales are carried by the conveyer 60, laterally or transversely of the body of the hay gatherer, and deposited upon a wagon or the like.

If it is so desired, the baler may be employed for baling hay from a stack, at which time it is stationary and the hay is fed to the same, between the conveyers 19 and 20, after which the operation is identical with that heretofore described.

From the foregoing description taken in connection with the accompanying drawings the advantages of construction and of the method of operation of the improved hay baler will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a device as set forth, a supporting structure, a raking structure carried by the rear end of said supporting structure, means for moving said raking structure into or out of a raking position, a plurality of packing arms carried by said supporting structure, means operatively connected to said packing arms for operating said arms upon the travel of said supporting structure, tension levers carried by said supporting structure against which the hay is forced by said packing arms.

2. In a hay harvester, the combination, of a portable baling chamber, raking means carried by said chamber, means for feeding hay from the raking means into said chamber, a crank shaft carried by said chamber, a plurality of packing arms carried by said crank shaft, means for rotating said crank shaft for moving said packing arms into a hay engaging position, and means for passing a tying cord about the bale formed in said chamber, means for operating said twine carrying means, means operable by said last named means for ejecting a tied bale from said chamber, compressing arms carried by said chamber and adapted to move into hay from an opposite side of a bale from said packing arms.

3. In a hay harvester, the combination, of a portable baling chamber, raking means carried by said chamber, means for feeding hay from the raking means into said chamber, a crank shaft carried by said chamber, a plurality of packing arms carried by said crank shaft, means for rotating said crank shaft for moving said packing arms into a hay engaging position, and means for passing a tying cord about the bale formed in said chamber, means for operating said twine carrying means, means operable by said last named means for ejecting a tied bale from said chamber, compressing arms carried by said chamber and adapted to move into hay from an opposite side of a bale from said packing arms, and means operable by said twine carrier operating means for moving said compressing arms into a hay engaging position.

4. In a hay harvester, the combination, of a portable baling chamber, raking means carried by said chamber, means for feeding hay from the raking means into said chamber, a crank shaft carried by said chamber, a plurality of packing arms carried by said crank shaft, means for rotating said crank shaft for moving said packing arms into a hay engaging position, compressing arms carried by said chamber and adapted to move into hay from an opposite side of a bale from said packing arms.

5. In a hay harvester, the combination, of a portable baling chamber, raking means carried by said baling chamber, means for feeding hay from said raking means into said chamber, a crank shaft carried by said chamber, a plurality of packing arms carried by said crank shaft, means for rotating said crank shaft for moving said packing arms into a hay engaging position, a shaft rotatably carried by said baling chamber, a plurality of compressing arms carried by said shaft, a spring connected to said shaft, and means operatively connected to said spring for rocking said shaft for moving the compressor arms into a hay engaging position, said compressing arms being mounted for movement into hay from an opposite side of the bale from said packing arms.

6. In a hay harvester, the combination, of a portable baling chamber, raking means carried by said baling chamber, means for feeding hay from said raking means into said chamber, a crank shaft carried by said chamber, a plurality of packing arms carried by said crank shaft, means for rotating said crank shaft for moving said packing arms into a hay engaging position, a shaft rotatably carried by said baling chamber, a plurality of compressing arms carried by said shaft, a spring connected to said shaft, means operatively connected to said spring for rocking said shaft for moving the compressor arms into a hay engaging position, said compressing arms being mounted for movement into hay from an opposite side of the bale from said packing arms, means for passing a tying twine about the bale formed in said chamber, means for operating said twine carrying means, and means operable by said last named means for ejecting a tied bale from said chamber.

In testimony whereof I affix my signature in presence of two witnesses.

EDWARD T. HUDSON.

Witnesses:
C. W. HARVEY,
H. C. HANNA.

Copies of this patent may be obtained for five cents each, by addressing the "Commissioner of Patents, Washington, D. C."